(12) United States Patent
Kwak et al.

(10) Patent No.: US 12,500,433 B2
(45) Date of Patent: Dec. 16, 2025

(54) BATTERY MANAGEMENT APPARATUS AND METHOD

(71) Applicant: LG Energy Solution, Ltd., Seoul (KR)

(72) Inventors: Jin-Seop Kwak, Daejeon (KR); Seong-Hyeon Ryu, Daejeon (KR)

(73) Assignee: LG Energy Solution, Ltd., Seoul (KR)

( * ) Notice: Subject to any disclaimer, the term of this patent is extended or adjusted under 35 U.S.C. 154(b) by 582 days.

(21) Appl. No.: 18/007,582

(22) PCT Filed: Nov. 25, 2021

(86) PCT No.: PCT/KR2021/017567
§ 371 (c)(1),
(2) Date: Dec. 1, 2022

(87) PCT Pub. No.: WO2022/114826
PCT Pub. Date: Jun. 2, 2022

(65) Prior Publication Data
US 2023/0238815 A1    Jul. 27, 2023

(30) Foreign Application Priority Data
Nov. 25, 2020  (KR) .................. 10-2020-0160345

(51) Int. Cl.
*H02J 7/00* (2006.01)
*H01M 10/44* (2006.01)

(52) U.S. Cl.
CPC .......... *H02J 7/0048* (2020.01); *H01M 10/44* (2013.01); *H02J 7/0013* (2013.01); *H02J 7/00712* (2020.01)

(58) Field of Classification Search
USPC ........................................... 320/132
See application file for complete search history.

(56) References Cited

U.S. PATENT DOCUMENTS

| | | |
|---|---|---|
| 9,840,161 B2 | 12/2017 | Chikkannanavar et al. |
| 10,141,762 B2 | 11/2018 | Shindo et al. |
| (Continued) | | |

FOREIGN PATENT DOCUMENTS

| | | |
|---|---|---|
| JP | 2000221249 A | 8/2000 |
| JP | 200896442 A | 4/2008 |
| (Continued) | | |

OTHER PUBLICATIONS

Extended European Search Report including Written Opinion for Application No. 21898652.9, dated Sep. 25, 2024, 11 pgs.

(Continued)

*Primary Examiner* — Samuel Berhanu
(74) *Attorney, Agent, or Firm* — Lerner David LLP

(57) ABSTRACT

A battery management apparatus includes a charging unit configured to charge a battery cell, a measuring unit configured to measure voltage and current of the battery cell, and a control unit configured to receive battery information including the voltage and current from the measuring unit, estimate a SOC of the battery cell based on the received battery information, calculate an internal resistance of the battery cell based on the battery information whenever the SOC of the battery cell increases by a criterion amount, compare a change pattern of the calculated internal resistance with a preset criterion pattern, and set a negative electrode capacity for the battery cell based on the comparison result.

12 Claims, 2 Drawing Sheets

(56) References Cited

U.S. PATENT DOCUMENTS

| | | | |
|---|---|---|---|
| 10,976,370 B2 * | 4/2021 | Furukawa | G01R 31/389 |
| 2008/0057396 A1 * | 3/2008 | Fujihara | H01M 4/60 |
| | | | 429/231.95 |
| 2010/0156356 A1 | 6/2010 | Asakura et al. | |
| 2011/0254559 A1 | 10/2011 | Nakashima et al. | |
| 2013/0099794 A1 | 4/2013 | Takahashi et al. | |
| 2013/0154577 A1 | 6/2013 | Iwane et al. | |
| 2013/0325379 A1 | 12/2013 | Nakamura | |
| 2015/0051854 A1 | 2/2015 | Joe et al. | |
| 2015/0100260 A1 | 4/2015 | Joe et al. | |
| 2016/0259011 A1 | 9/2016 | Joe | |
| 2017/0234930 A1 | 8/2017 | Lee et al. | |
| 2017/0366015 A1 | 12/2017 | Luo et al. | |
| 2018/0292461 A1 | 10/2018 | Kim et al. | |
| 2019/0079138 A1 | 3/2019 | Sano | |
| 2019/0219641 A1 | 7/2019 | Iwane et al. | |
| 2020/0217901 A1 | 7/2020 | Sugiyama et al. | |
| 2022/0069370 A1 | 3/2022 | Oniki et al. | |

FOREIGN PATENT DOCUMENTS

| | | |
|---|---|---|
| JP | 4172222 B2 | 10/2008 |
| JP | 2010223768 A | 10/2010 |
| JP | 2012132724 A | 7/2012 |
| JP | 2014006245 A | 1/2014 |
| JP | 5537236 B2 | 7/2014 |
| JP | 2014211307 A | 11/2014 |
| JP | 2015059816 A | 3/2015 |
| JP | 2016038276 A | 3/2016 |
| JP | 2017111058 A | 6/2017 |
| JP | 2019114475 A | 7/2019 |
| JP | 2019176637 A | 10/2019 |
| JP | 6624012 B2 | 12/2019 |
| JP | 202078179 A | 5/2020 |
| JP | 2020109367 A | 7/2020 |
| KR | 20090122470 A | 11/2009 |
| KR | 20180004991 A | 1/2018 |
| KR | 101897859 B1 | 9/2018 |
| WO | 2017212815 A1 | 12/2017 |
| WO | 2018012364 A1 | 1/2018 |
| WO | 2018-056448 A1 | 3/2018 |

OTHER PUBLICATIONS

International Search Report for Application No. PCT/KR2021/017567 mailed Mar. 23, 2022, pp. 1-3.

* cited by examiner

BATTERY MANAGEMENT APPARATUS AND METHOD

CROSS-REFERENCE TO RELATED APPLICATIONS

This application is a national phase entry under 35 U.S.C. § 371 of International Application No. PCT/KR2021/017567 filed on Nov. 25, 2021, which claims priority from Korean Patent Application No. 10-2020-0160345 filed on Nov. 25, 2020 in the Republic of Korea, the disclosures of which are incorporated herein by reference in their entirety.

TECHNICAL FIELD

The present disclosure relates to a battery management apparatus and method, and more particularly, to a battery management apparatus and method capable of setting a negative electrode capacity of a battery cell.

BACKGROUND ART

Recently, the demand for portable electronic products such as notebook computers, video cameras and portable telephones has increased sharply, and electric vehicles, energy storage batteries, robots, satellites and the like have been developed in earnest. Accordingly, high-performance batteries allowing repeated charging and discharging are being actively studied.

Batteries commercially available at present include nickel-cadmium batteries, nickel hydrogen batteries, nickel-zinc batteries, lithium batteries and the like. Among them, the lithium batteries are in the limelight since they have almost no memory effect compared to nickel-based batteries and also have very low self-charging rate and high energy density.

When such a battery is overcharged, lithium plating in which metallic lithium is deposited on the negative electrode of the battery may occur, and there is a problem that an internal short circuit may occur between the positive electrode and the negative electrode of the battery due to the deposited metallic lithium.

In general, when designing a battery, an index for comparing how much lithium free space is secured in the negative electrode compared to the positive electrode is usually referred to as the N/P ratio. That is, the N/P ratio may be regarded as the ratio of the negative electrode capacity to the positive electrode capacity of the battery.

To prevent lithium plating from occurring, the N/P ratio of the battery is designed to exceed 1 (or 100%). However, even if the N/P ratio is designed to exceed 1 (or 100%), the optimal N/P ratio may be changed from the designed value by the activation process and degradation of the battery. Therefore, in order to improve the stability of the battery, it is important to set the optimal N/P ratio and the optimal negative electrode capacity for the battery through actual measurement.

SUMMARY

Technical Problem

The present disclosure is designed to solve the problems of the related art, and therefore the present disclosure is directed to providing a battery management apparatus and method for setting an optimal negative electrode capacity for a battery cell.

These and other objects and advantages of the present disclosure may be understood from the following detailed description and will become more fully apparent from the exemplary embodiments of the present disclosure. Also, it will be easily understood that the objects and advantages of the present disclosure may be realized by the means shown in the appended claims and combinations thereof.

Technical Solution

A battery management apparatus according to one aspect of the present disclosure may comprise: a sensor configured to measure battery information including a voltage and a current of a battery cell; a controller; and memory having programmed thereon instructions configured to cause the controller to: receive the battery information from the sensor; estimate a state of charge (SOC) of the battery cell based on the received battery information; calculate an internal resistance of the battery cell based on the battery information in response to the SOC of the battery cell increasing by a threshold amount; compare a change pattern of the calculated internal resistance with a predetermined pattern; and set a negative electrode capacity for the battery cell based on the comparison.

The instructions may be configured to cause the controller to generate a resistance profile representing a corresponding relationship between the internal resistance and the SOC, determine the change pattern of the internal resistance based on the generated resistance profile, and determine whether the determined change pattern matches the predetermined pattern, whereby the negative electrode capacity for the battery cell may be set based on whether the determined change pattern matches the predetermined pattern.

In the predetermined pattern the internal resistance may increase and then decrease for a range of SOCs corresponding to a reference SOC region of the generated resistance profile.

The instructions may be configured to cause the controller to determine the change pattern of the internal resistance within the reference SOC region of the generated resistance profile.

The instructions may be configured to cause the controller to determine a target peak in the generated resistance profile, select a target SOC corresponding to the determined target peak, and set the negative electrode capacity for the battery cell based further on the selected target SOC.

The instructions may be configured to cause the controller to determine a negative electrode capacity ratio corresponding to the target SOC, and set the negative electrode capacity for the battery cell based further on one of the determined negative electrode capacity ratio or a preset threshold ratio.

The instructions may be configured to cause the controller to set the negative electrode capacity for the battery cell based further on the determined negative electrode capacity ratio in response to the determined negative electrode capacity ratio exceeding the preset criterion ratio.

The instructions may be configured to cause the controller to set the negative electrode capacity for the battery cell based on the threshold ratio in response to the determined negative electrode capacity ratio being equal to or less than the preset criterion ratio.

The instructions may be configured to cause the controller to control a charger to stop charging the battery cell in response to the SOC of the battery cell increasing by a threshold amount, and calculate the internal resistance of the battery cell based on the battery information while the charging is stopped.

The battery management apparatus may further include a charger configured to charge the battery cell.

A battery pack according to another aspect of the present disclosure may comprise the battery management apparatus according to any of the embodiments of the present disclosure.

A battery manufacturing device according to still another aspect of the present disclosure may comprise the battery management apparatus according to any of the embodiments of the present disclosure.

A battery management method according to still another aspect of the present disclosure may comprise: measuring, by a sensor, battery information including voltage and current of the battery cell; estimating, by the controller, a SOC of the battery cell based on measured the battery information; calculating, by the controller, an internal resistance of the battery cell based on the battery information in response to the SOC of the battery cell increasing by a threshold amount; and comparing, by the controller, a change pattern of the calculated internal resistance with a predetermined pattern; and setting, by the controller, a negative electrode capacity for the battery cell based on the comparison.

Advantageous Effects

According to one aspect of the present disclosure, there is an advantage that the negative electrode capacity corresponding to the battery cell may be set based on the SOC in which the internal resistance of the battery cell decreases. That is, the negative electrode capacity for the battery cell is not uniformly set based on the theoretical N/P ratio, but may be set through actual verification.

The effects of the present disclosure are not limited to the effects mentioned above, and other effects not mentioned will be clearly understood by those skilled in the art from the description of the claims.

BRIEF DESCRIPTION OF THE DRAWINGS

The accompanying drawings illustrate a preferred embodiment of the present disclosure and together with the foregoing disclosure, serve to provide further understanding of the technical features of the present disclosure, and thus, the present disclosure is not construed as being limited to the drawing.

DETAILED DESCRIPTION

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

Additionally, in describing the present disclosure, when it is deemed that a detailed description of relevant known elements or functions renders the key subject matter of the present disclosure ambiguous, the detailed description is omitted herein.

The terms including the ordinal number such as "first", "second" and the like, may be used to distinguish one element from another among various elements, but not intended to limit the elements by the terms.

Throughout the specification, when a portion is referred to as "comprising" or "including" any element, it means that the portion may include other elements further, without excluding other elements, unless specifically stated otherwise.

Furthermore, the term "control unit" described in the specification refers to a unit that processes at least one function or operation, and may be implemented by hardware, software, or a combination of hardware and software.

In addition, throughout the specification, when a portion is referred to as being "connected" to another portion, it is not limited to the case that they are "directly connected", but it also includes the case where they are "indirectly connected" with another element being interposed between them.

Hereinafter, preferred embodiments of the present disclosure will be described in detail with reference to the accompanying drawings.

Figure 1:
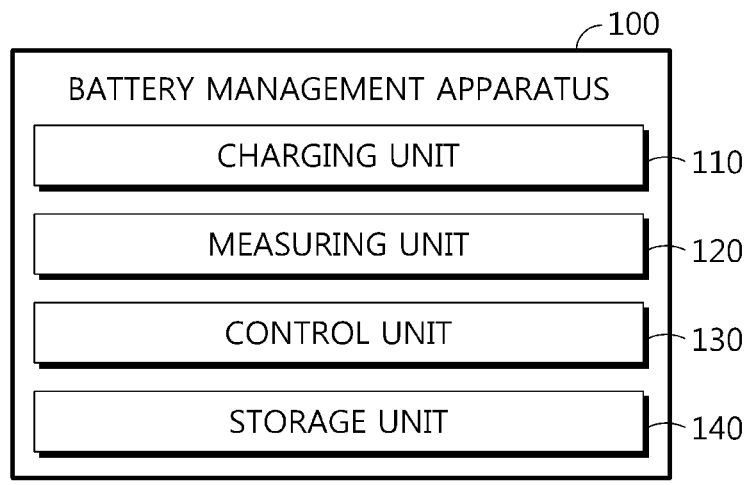
FIG. 1 is a diagram schematically showing a battery management apparatus according to an embodiment of the present disclosure.

FIG. 1 is a diagram schematically showing a battery management apparatus 100 according to an embodiment of the present disclosure.

Referring to FIG. 1, the battery management apparatus 100 according to an embodiment of the present disclosure may include a charging unit 110, a measuring unit 120 and a control unit 130.

The charging unit 110 may be configured to charge a battery cell.

Here, the battery cell means one physically separable independent cell including a negative electrode terminal and a positive electrode terminal. For example, one pouch-type lithium polymer cell may be regarded as a battery cell.

Preferably, the charging unit 110 may charge the battery cell with a constant current (CC). For example, the charging unit 110 may charge the battery cell with a constant current at 0.2 C (C-rate).

The measuring unit 120 may be configured to measure voltage and current of the battery cell.

The measuring unit 120 may be connected to a positive electrode terminal and a negative electrode terminal of the battery cell. The measuring unit 120 may measure a positive electrode voltage and a negative electrode voltage of the battery cell, and measure the voltage of the battery cell based on the difference between the measured positive electrode voltage and the negative electrode voltage.

In addition, the measuring unit 120 may be connected to a current measuring unit provided on a charging and discharging path of the battery cell. The measuring unit 120 may measure a charging current for the battery cell through the current measuring unit. Here, the charging and discharging path may be a high current path through which the charging current and/or discharging current of the battery cell flow. Also, the current measuring unit may be a current meter or a shunt resistor.

The control unit 130 may be configured to receive battery information including the voltage and current from the measuring unit 120.

Specifically, the control unit 130 may be connected to communicate with the measuring unit 120. The measuring unit 120 may transmit the battery information about the voltage and current of the measured battery cell to the control unit 130. The control unit 130 may receive the battery information from the measuring unit 120 to obtain the battery information.

The control unit 130 may be configured to estimate a State of Charge (SOC) of the battery cell based on the received battery information.

For example, the control unit 130 may estimate the SOC of the battery cell based on the voltage of the battery cell by using a preset equivalent circuit model (ECM) and an extended Kalman filter (EKF) for the battery cell. As another example, the control unit 130 may estimate the SOC of the battery cell based on the current of the battery cell by using the ampere counting method. It should be noted that since the process of estimating the SOC of a battery cell based on the extended Kalman filter or the ampere counting method is known, a detailed description thereof will be omitted.

The control unit 130 may be configured to calculate an internal resistance of the battery cell based on the battery information whenever the SOC of the battery cell increases by a criterion amount.

Since the battery cell is charged with a constant current by the charging unit 110, the control unit 130 may calculate the internal resistance of the battery cell based on the voltage change amount and the current whenever the SOC of the battery cell increases by the criterion amount.

For example, the internal resistance may be calculated as a ratio of the voltage change amount to the current. That is, the control unit 130 may calculate the internal resistance of the battery cell by calculating the formula "voltage change amount÷current".

The control unit 130 may be configured to compare the change pattern of the calculated internal resistance with a preset criterion pattern.

Here, the change pattern of the internal resistance may be an increase/decrease pattern of the internal resistance with respect to the increase in the SOC of the battery cell.

First, the control unit 130 may be configured to generate a resistance profile representing a corresponding relationship between the internal resistance and the SOC.

Figure 2:
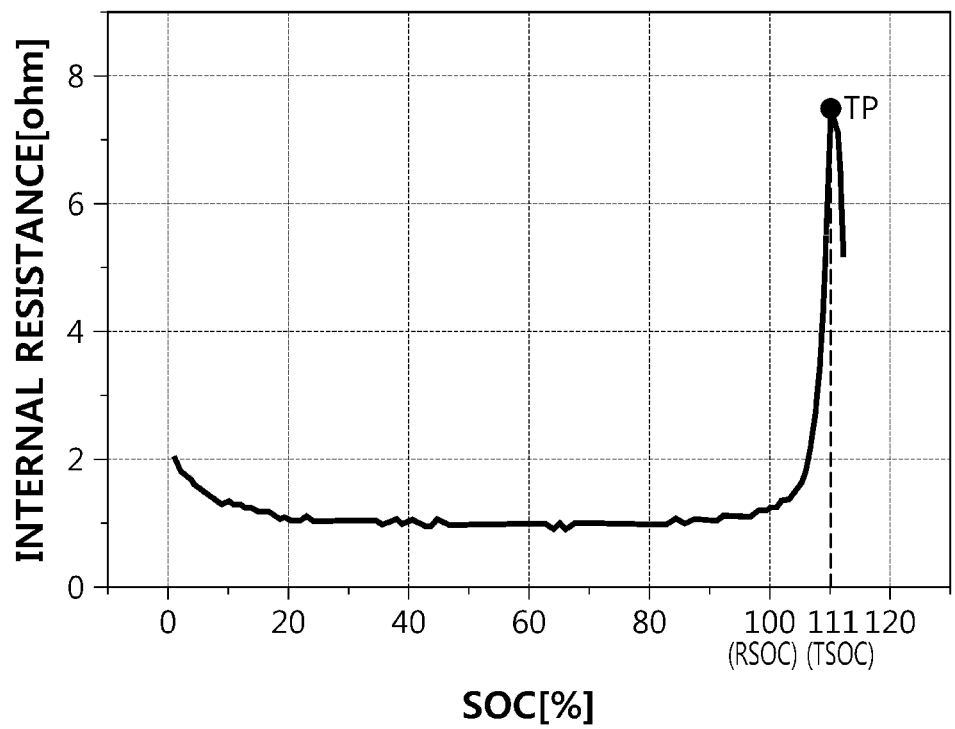
FIG. 2 is a diagram schematically showing a resistance profile according to an embodiment of the present disclosure.

FIG. 2 is a diagram schematically showing a resistance profile according to an embodiment of the present disclosure.

Referring to FIG. 2, the resistance profile may be a profile representing a corresponding relationship between the SOC and the internal resistance. Specifically, the resistance profile may be expressed as an X-Y graph when SOC is set to X and internal resistance is set to Y.

In the embodiment of FIG. 2, the battery cell may be charged from SOC 0% to 113% by the charging unit 110. In addition, the control unit 130 may generate a resistance profile representing a corresponding relationship between the calculated internal resistance and the SOC of the battery cell.

The control unit 130 may be configured to determine a change pattern of the internal resistance based on the generated resistance profile.

Specifically, the control unit 130 may be configured to determine the change pattern of the internal resistance with respect to the reference SOC region in the generated resistance profile.

Here, the reference SOC region may be an SOC region exceeding a reference SOC (RSOC). That is, the control unit 130 may determine a change pattern of internal resistance for the reference SOC (RSOC) excess region in the generated resistance profile.

For example, in the embodiment of FIG. 2, the reference SOC (RSOC) may be preset to 100%, and the reference SOC region may be preset to the SOC 100% excess region. The control unit 130 may determine a change pattern of the internal resistance for the SOC 100% excess region.

Specifically, in the embodiment of FIG. 2, the internal resistance may be increased as the SOC increases after the reference SOC (RSOC). In addition, based on SOC 111%, the internal resistance may be reduced. Accordingly, the control unit 130 may determine the change pattern of internal resistance for the battery cell as an "increase and decrease pattern".

The control unit 130 may be configured to judge whether the determined change pattern matches the criterion pattern.

Specifically, the criterion pattern may be preset as a pattern in which the internal resistance increases and then decreases in the reference SOC region. That is, the control unit 130 may judge whether the determined change pattern is a pattern in which the internal resistance increases and then decreases.

For example, in the embodiment of FIG. 2, the control unit 130 may determine the change pattern of the internal resistance for the battery cell as an "increase and decrease pattern". In this case, the control unit 130 may judge that the change pattern of the internal resistance and the criterion pattern match each other.

The control unit 130 may be configured to set a negative electrode capacity for the battery cell based on the comparison result.

Specifically, the control unit 130 may calculate a N/P ratio for the battery cell based on the SOC corresponding to a point at which the internal resistance is reduced in the resistance profile. In addition, the control unit 130 may set the negative electrode capacity for the battery cell based on the calculated N/P ratio.

Here, the N/P ratio may be a value obtained by dividing the negative electrode capacity calculated in consideration of the area of the negative electrode and the capacity per g (gram) by the positive electrode capacity obtained in consideration of the area of the positive electrode and the capacity per gram. That is, the N/P ratio is a negative electrode capacity ratio of the battery cell, and may be a ratio of the negative electrode capacity to the positive electrode capacity of the battery cell. For example, the N/P ratio may be calculated according to the formula "negative electrode capacity÷positive electrode capacity" or "negative electrode capacity÷positive electrode capacity×100".

Since this N/P ratio has a significant effect on the safety and capacity of the battery cell, it generally has a value greater than 1 (or 100%). That is, the battery cell may be manufactured so that the capacity of the included negative electrode is greater than the capacity of the positive electrode. For reference, if the N/P ratio is 1 (or 100%) or less, lithium plating in which metallic lithium is precipitated may occur during the charging and discharging of the battery cell. When lithium plating occurs, it acts as a cause of rapidly deteriorating the safety of the battery cell during high-rate discharging.

For example, in the embodiment of FIG. 2, the SOC corresponding to the point at which the internal resistance is reduced may be 111%. Accordingly, the control unit 130 may calculate the N/P ratio for the battery cell as 1.11 or 111%. In addition, the control unit 130 may set the negative electrode capacity for the battery cell based on the set N/P ratio and the positive electrode capacity for the battery cell.

Preferably, the positive electrode capacity may be preset for a battery cell in a BOL (Beginning of Life) state. Accordingly, the control unit 130 may set the negative electrode capacity corresponding to the battery cell based on the preset positive electrode capacity and the calculated N/P ratio.

The battery management apparatus 100 according to an embodiment of the present disclosure has an advantage of setting the negative electrode capacity corresponding to the battery cell based on the SOC in which the internal resistance of the battery cell is reduced. That is, according to the battery management apparatus 100, the negative electrode capacity for the battery cell is not uniformly set based on the theoretical N/P ratio, but may be set through actual verification.

For example, according to the negative electrode capacity set by the battery management apparatus 100, the negative electrode capacity included in a cell of the same type as the battery cell may be determined. That is, in cells manufactured to correspond to the negative electrode capacity set by the battery management apparatus 100, the possibility of occurrence of lithium plating may be reduced.

Meanwhile, the control unit 130 provided in the battery management apparatus 100 may selectively include processors known in the art, application-specific integrated circuit (ASIC), other chipsets, logic circuits, registers, communication modems, data processing devices, and the like to execute various control logic performed in the present disclosure. Also, when the control logic is implemented in software, the control unit 130 may be implemented as a set of program modules. At this time, the program module may be stored in a memory and executed by the control unit 130. The memory may be located inside or out of the control unit 130 and may be connected to the control unit 130 by various well-known means.

In addition, the battery management apparatus 100 may further include a storage unit 140. The storage unit 140 may store data necessary for operation and function of each component of the battery management apparatus 100, data generated in the process of performing the operation or function, or the like. The storage unit 140 is not particularly limited in its kind as long as it is a known information storage means that can record, erase, update and read data. As an example, the information storage means may include random access memory (RAM), flash memory, read-only memory (ROM), electrically erasable programmable read-only memory (EEPROM), registers, and the like. In addition, the storage unit 140 may store program codes in which processes executable by the control unit 130 are defined.

For example, the storage unit 140 may store information on the positive electrode capacity of the battery cell in advance. The control unit 130 may access the storage unit 140 to obtain the information on the positive electrode capacity of the battery cell.

Hereinafter, a process in which the control unit 130 sets the negative electrode capacity will be described in more detail with reference to FIG. 2.

The control unit 130 may be configured to determine a target peak TP in the resistance profile.

The control unit 130 may determine the target peak TP in the reference SOC region. Here, the target peak TP may be a point having an upwardly convex form in the resistance profile. Specifically, the target peak TP may be a point at which the instantaneous change rate of the internal resistance to SOC is 0. That is, the instantaneous change rate may change from positive to negative based on the target peak TP.

For example, in the embodiment of FIG. 2, the control unit 130 may determine the target peak TP in the reference SOC (RSOC) excess region.

Also, the control unit 130 may be configured to select a target SOC (TSOC) corresponding to the determined target peak TP.

For example, in the embodiment of FIG. 2, the control unit 130 may select the target SOC (TSOC) corresponding to the target peak TP as 111%.

In addition, the control unit 130 may be configured to set the negative electrode capacity based on the selected target SOC (TSOC).

As described above, the control unit 130 may be configured to determine a negative electrode capacity ratio corresponding to the target SOC (TSOC).

For example, in the embodiment of FIG. 2, the control unit 130 may determine the negative electrode capacity ratio as 1.11 or 111% based on the target SOC (TSOC).

If the determined negative electrode capacity ratio exceeds the preset criterion ratio, the control unit 130 may be configured to set the negative electrode capacity for the battery cell based on the determined negative electrode capacity ratio.

Conversely, when the determined negative electrode capacity ratio is equal to or less than the preset criterion ratio, the control unit 130 may be configured to set the negative electrode capacity for the battery cell based on the criterion ratio.

In general, the charging current may promote an electrochemical reaction at the interface of the negative electrode of the battery cell, thereby allowing lithium ions to be intercalated into the negative electrode. In this case, the internal resistance of the battery cell calculated by the oxidation-reduction reaction according to the lithium concentration of the positive electrode and the negative electrode of the battery cell may be gradually increased. However, when metallic lithium is deposited on the negative electrode, a part of the charging current flows through the deposited metallic lithium, so the calculated internal resistance of the battery cell may be gradually reduced. This is because only a part of the charging current promotes the oxidation-reduction reaction.

Accordingly, the control unit 130 may set the negative electrode capacity of the battery cell as a sufficiently large capacity to reduce the possibility of occurrence of lithium plating, based on a larger value between the determined negative electrode capacity ratio and the criterion ratio.

For example, in the embodiment of FIG. 2, it is assumed that the determined negative electrode capacity ratio 1.11 (or 111%) is greater than the criterion ratio. The control unit 130 may set the negative electrode capacity of the battery cell based on the determined negative electrode capacity ratio and the preset positive electrode capacity. Specifically, the control unit 130 may calculate the negative electrode capacity according to the formula "N/P ratio×positive electrode capacity" or "N/P ratio×positive electrode capacity÷100".

As such, it may be regarded that the preset criterion ratio and the calculated N/P ratio are different because a SEI (Solid Electrolyte Interphase) layer is formed on the negative electrode by the reaction at the interface of the negative electrode and the electrolyte while the battery cell is being activated and the negative electrode irreversible capacity increases due to the formed SEI layer.

Therefore, the battery management apparatus 100 according to an embodiment of the present disclosure has an advantage of setting the negative electrode capacity as a larger capacity by comparing the actually measured N/P ratio of the battery cell and the preset (pre-designed) criterion ratio. Accordingly, cells manufactured based on the set negative electrode capacity may be more robust to lithium plating.

Meanwhile, the control unit 130 may be configured to stop charging of the battery cell by controlling the charging unit 110 for a predetermined time whenever the SOC of the battery cell increases by a criterion amount.

In addition, the control unit 130 may be configured to calculate the internal resistance of the battery cell based on the battery information for the predetermined time.

For example, the control unit 130 may stop charging for 3 seconds whenever the SOC of the battery cell increases by 1%. In addition, the control unit 130 may calculate the internal resistance of the battery based on the voltage change rate of the battery cell for 3 seconds during which charging is stopped. In addition, the control unit 130 may generate a resistance profile by mapping the SOC increased by 1% and the internal resistance calculated based on the voltage change rate for 3 seconds.

In general, when a current is applied to a battery cell, an instantaneous voltage drop may occur due to electrical and electrolytic ionic resistance (Ro, ohmic resistance). For example, the voltage drop according to the ohmic resistance (Ro) may be generated within about 0.1 second after the current is applied.

Thereafter, a voltage drop may be generated by a resistance ($R_{CT}$) according to a charge transfer reaction between the electrode and the electrolyte surface. For example, a voltage drop may be generated by a resistance ($R_{CT}$) according to the charge transfer reaction for about 3 seconds.

In addition, a voltage drop may be generated due to a polarization resistance ($R_P$) according to ionic diffusion to the solid surface. For example, the voltage drop according to the polarization resistance ($R_P$) may be generated linearly while the current is applied.

When metallic lithium is deposited on the negative electrode, since a part of the charging current flows through the metallic lithium, the resistance ($R_{CT}$) according to the charge transfer reaction may be reduced. This is because de-intercalation and intercalation of lithium ions according to oxidation-reduction reactions at the positive electrode and the negative electrode occurs only by a part of the charging current, and the rest of the charging current flows through the metallic lithium. That is, when lithium plating occurs on the negative electrode, the resistance ($R_{CT}$) according to charge transfer reaction may be affected, among the Ohmic resistance (Ro), the resistance ($R_{CT}$) according to charge transfer reaction and the polarization resistance ($R_P$).

Therefore, in order to calculate the resistance ($R_{CT}$) according to the charge transfer reaction to the battery cell, the control unit 130 may stop charging whenever the SOC of the battery cell increases by the criterion amount, and calculate the internal resistance of the battery cell (in particular, the resistance ($R_{CT}$) according to the charge transfer reaction) based on the voltage change rate of the battery cell for a predetermined time.

For example, the control unit 130 may stop charging whenever the SOC of the battery cell increases by 1%, and calculate the internal resistance of the battery cell based on the voltage change rate of the battery cell for 3 seconds. Thereafter, the control unit 130 may control the charging unit 110 to resume charging of the battery cell.

In addition, the battery management apparatus 100 according to the present disclosure may be provided in a battery pack 1. That is, the battery pack 1 according to the present disclosure may include the above-described battery management apparatus 100 and one or more battery cells B. In addition, the battery pack 1 may further include electrical equipment (relays, fuses, etc.) and a case.

Figure 3:
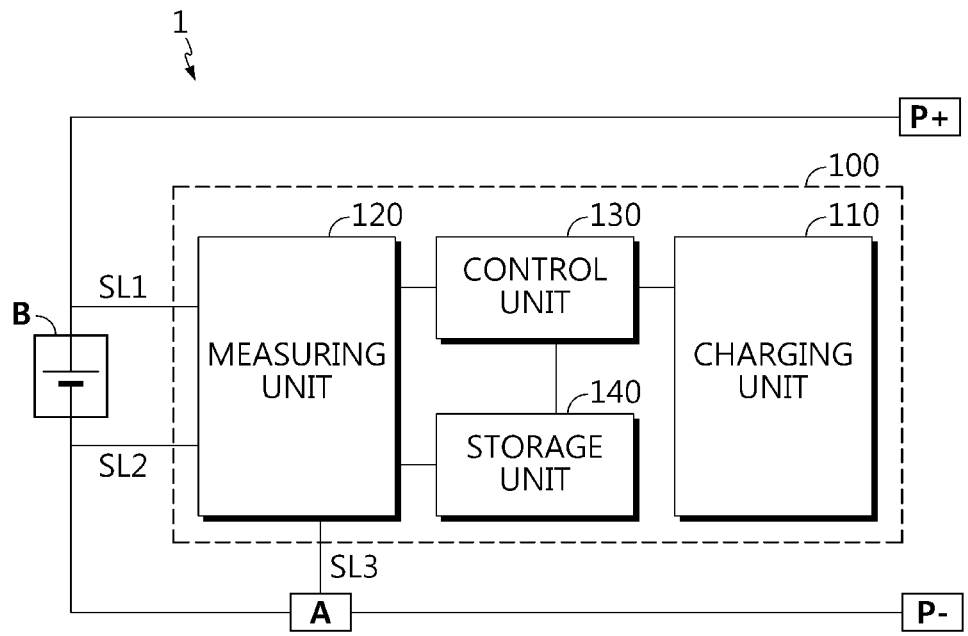
FIG. 3 is a diagram schematically showing an exemplary configuration of a battery pack according to another embodiment of the present disclosure.

FIG. 3 is a diagram schematically showing an exemplary configuration of a battery pack 1 according to another embodiment of the present disclosure.

In the embodiment of FIG. 3, the measuring unit 120 may be connected to a first sensing line SL1, a second sensing line SL2, and a third sensing line SL3. The measuring unit 120 may measure the positive electrode voltage of the battery cell B through the first sensing line SL1, and measure the negative electrode voltage of the battery cell B through the second sensing line SL2. In addition, the measuring unit 120 may measure the voltage of the battery cell B by calculating a difference between the measured positive electrode voltage and the measured negative electrode voltage.

In addition, the measuring unit 120 may be connected to a current measuring unit A through the third sensing line SL3. The current measuring unit A may be provided on the charging and discharging path of the battery cell B. For example, the current measuring unit A may be a current meter or a shunt resistor.

In addition, the charging and discharging path may be a high current path through which the charging current and the discharging current of the battery cell B flow. Accordingly, the measuring unit 120 may measure the current of the battery cell B through the third sensing line SL3 connected to the current measuring unit A, and measure the capacity of the battery cell B based on the measured current.

In addition, both ends of the charging unit 110 may be connected to a charging and discharging path of the battery cell B. For example, one end of the charging unit 110 may be connected to the positive electrode of the battery cell B in the charging and discharging path. In addition, the other end of the charging unit 110 may be connected to the negative electrode of the battery cell B in the charging and discharging path. In addition, the charging unit 110 may charge the battery cell B under the control of the control unit 130.

For example, in the embodiment of FIG. 3, in the process of charging the battery cell B with a constant current, the charging unit 110 may stop charging for a predetermined time whenever the SOC of the battery cell B increases by a criterion amount. Thereafter, after a predetermined time elapses, the charging unit 110 may charge the battery cell B again with a constant current.

In addition, the battery management apparatus 100 according to the present disclosure may be provided in a battery manufacturing device.

For example, the battery manufacturing device may set a negative electrode capacity for a criterion cell and mass-produce cells of the same type based on the set negative electrode capacity. That is, the negative electrode capacity for the criterion cell may be set by the battery management apparatus 100, and cells may be manufactured according to the set negative electrode capacity.

Therefore, since the cell manufactured by the battery manufacturing device includes a sufficiently large negative electrode capacity compared to the positive electrode capacity, the possibility of occurrence of lithium plating may be significantly reduced. In addition, since the negative electrode capacity of the cell manufactured by the battery manufacturing device is set to correspond to the N/P ratio at which lithium plating starts to occur in an overcharged criterion cell, an optimal capacity that is not excessive may be set.

As a result, since the cell manufactured by the battery manufacturing device has an optimal negative electrode capacity, it may be manufactured with an optimal volume in which the possibility of occurrence of lithium plating is significantly lowered. Accordingly, the volume of a battery module, a battery pack 1, and/or a battery rack including the cells manufactured by the battery manufacturing device may also be reasonably reduced.

Figure 4:
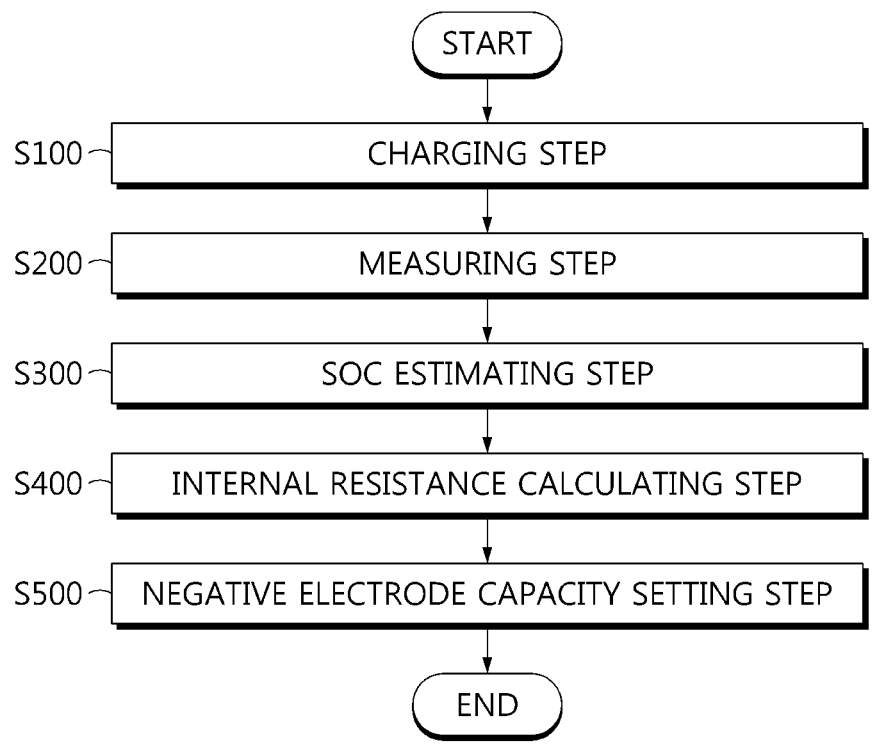
FIG. 4 is a diagram schematically showing a battery management method according to still another embodiment of the present disclosure.

FIG. 4 is a diagram schematically showing a battery management method according to still another embodiment of the present disclosure.

Specifically, each step of the battery management method may be performed by the battery management apparatus 100. Hereinafter, for convenience of description, contents overlapping with the previously described contents will be omitted or briefly described.

Referring to FIG. 4, the battery management method may include a charging step (S100), a measuring step (S200), an SOC estimating step (S300), an internal resistance calculating step (S400) and a negative electrode capacity setting step (S500).

The charging step (S100) is a step of charging the battery cell B, and may be performed by the charging unit 110.

For example, in the embodiment of FIG. 3, the charging unit 110 may charge the battery cell B with a constant current.

The measuring step (S200) is a step of measuring battery information including voltage and current of the battery cell B while the battery cell B is being charged, and may be performed by the measuring unit 120.

For example, in the embodiment of FIG. 3, the measuring unit 120 may measure the voltage of the battery cell B through the first sensing line SL1 and the second sensing line SL2, and measure the current of the battery cell B through the third sensing line SL3.

The SOC estimating step (S300) is a step of estimating a SOC of the battery cell B based on the battery information measured in the measuring step (S200), and may be performed by the control unit 130.

For example, the control unit 130 may estimate the SOC of battery cell B by using an extended Kalman filter or an ampere counting method based on the battery information.

The internal resistance calculating step (S400) is a step of calculating an internal resistance of the battery cell B based on the battery information whenever the SOC of the battery cell B increases by a criterion amount, and may be performed by the control unit 130.

For example, whenever the SOC of the battery cell B increases by the criterion amount, the control unit 130 may calculate the internal resistance of the battery cell B based on the voltage change amount and the current of the battery cell B for a predetermined time. Specifically, the control unit 130 may calculate the internal resistance of the battery cell B by calculating the formula "voltage change amount÷current".

The negative electrode capacity setting step (S500) is a step of comparing the calculated internal resistance change pattern with a preset criterion pattern and setting a negative electrode capacity corresponding to the battery cell B based on the comparison result, and may be performed by the control unit 130.

For example, in the embodiment of FIG. 2, the control unit 130 may generate a resistance profile representing a corresponding relationship between the SOC and the internal resistance of the battery cell B. In addition, the control unit 130 may determine a target peak TP in the resistance profile and determine a negative electrode capacity ratio (e.g., N/P ratio) for the battery cell B based on a target SOC (TSOC) corresponding to the determined target peak TP. Finally, the control unit 130 may set an optimal negative electrode capacity for the battery cell B according to a result of comparing the determined negative electrode capacity ratio and the criterion ratio.

The embodiments of the present disclosure described above may not be implemented only through an apparatus and a method, but may be implemented through a program that realizes a function corresponding to the configuration of the embodiments of the present disclosure or a recording medium on which the program is recorded. The program or recording medium may be easily implemented by those skilled in the art from the above description of the embodiments.

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Additionally, many substitutions, modifications and changes may be made to the present disclosure described hereinabove by those skilled in the art without departing from the technical aspects of the present disclosure, and the present disclosure is not limited to the above-described embodiments and the accompanying drawings, and each embodiment may be selectively combined in part or in whole to allow various modifications.

REFERENCE SIGNS

1: battery pack
100: battery management apparatus
110: charging unit
120: measuring unit
130: control unit
140: storage unit

What is claimed is:

1. A battery management apparatus, comprising:
  a sensor configured to measure battery information including a voltage and a current of a battery cell;
  a controller; and
  memory having programmed thereon instructions configured to cause the controller to:
    receive the battery information from the sensor;
    estimate a state of charge (SOC) of the battery cell based on the received battery information;
    calculate an internal resistance of the battery cell based on the battery information in response to the SOC of the battery cell increasing by a threshold amount;
    compare a change pattern of the calculated internal resistance with a predetermined pattern; and
    set a negative electrode capacity for the battery cell based on the comparison.

2. The battery management apparatus according to claim 1,
  wherein the instructions are configured to cause the controller to:

generate a resistance profile representing a corresponding relationship between the internal resistance and the SOC;

determine the change pattern of the internal resistance based on the generated resistance profile; and determine whether the determined change pattern matches the predetermined pattern, wherein the negative electrode capacity for the battery cell is set based on whether the determined change pattern matches the predetermined pattern.

3. The battery management apparatus according to claim 2, wherein, in the predetermined pattern, the internal resistance increases and then decreases for a range of SOCs corresponding to a reference SOC region of the generated resistance profile.

4. The battery management apparatus according to claim 3, wherein the instructions are configured to cause the controller to determine the change pattern of the internal resistance within the reference SOC region of the generated resistance profile.

5. The battery management apparatus according to claim 2, wherein the instructions are configured to cause the controller to:

determine a target peak in the generated resistance profile;

select a target SOC corresponding to the determined target peak; and set the negative electrode capacity for the battery cell based further on the selected target SOC.

6. The battery management apparatus according to claim 5, wherein the instructions are configured to cause the controller to:

determine a negative electrode capacity ratio corresponding to the target SOC; and set the negative electrode capacity for the battery cell based further on one of the determined negative electrode capacity ratio or a preset threshold ratio.

7. The battery management apparatus according to claim 6, wherein the instructions are configured to cause the controller to:

set the negative electrode capacity for the battery cell based further on the determined negative electrode capacity ratio in response to the determined negative electrode capacity ratio exceeding the preset criterion ratio; and set the negative electrode capacity for the battery cell based on the threshold ratio in response to the determined negative electrode capacity ratio being equal to or less than the preset criterion ratio.

8. The battery management apparatus according to claim 1, wherein the instructions are configured to cause the controller to:

control a charger to stop charging the battery cell in response to the SOC of the battery cell increasing by a threshold amount; and calculate the internal resistance of the battery cell based on the battery information while the charging is stopped.

9. A battery pack, comprising the battery management apparatus according to claim 1.

10. A battery manufacturing device, comprising the battery management apparatus according to claim 1.

11. A battery management method, comprising:

measuring, by a sensor, battery information including voltage and current of the battery cell;

estimating, by the controller, a SOC of the battery cell based on measured the battery information-;

calculating, by the controller, an internal resistance of the battery cell based on the battery information in response to the SOC of the battery cell increasing by a threshold amount; and comparing, by the controller, a change pattern of the calculated internal resistance with a predetermined pattern; and setting, by the controller, a negative electrode capacity for the battery cell based on the comparison.

12. The battery management apparatus according to claim 1, further comprising a charger configured to charge the battery cell.

* * * * *